US011586689B2

(12) United States Patent
Yang et al.

(10) Patent No.: US 11,586,689 B2
(45) Date of Patent: Feb. 21, 2023

(54) ELECTRONIC APPARATUS AND CONTROLLING METHOD THEREOF

(71) Applicant: SAMSUNG ELECTRONICS CO., LTD., Suwon-si (KR)

(72) Inventors: Jaechul Yang, Suwon-si (KR); Munjo Kim, Suwon-si (KR); Youngbin Shin, Suwon-si (KR); Changho Paeon, Suwon-si (KR); Inchul Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 409 days.

(21) Appl. No.: 16/710,479

(22) Filed: Dec. 11, 2019

(65) Prior Publication Data

US 2020/0210505 A1 Jul. 2, 2020

(30) Foreign Application Priority Data

Jan. 2, 2019 (KR) ........................ 10-2019-0000450

(51) Int. Cl.
*G06F 16/9535* (2019.01)
*G06F 16/2457* (2019.01)
*G06F 40/30* (2020.01)
*G06F 40/279* (2020.01)

(52) U.S. Cl.
CPC .... *G06F 16/9535* (2019.01); *G06F 16/24578* (2019.01); *G06F 40/279* (2020.01); *G06F 40/30* (2020.01)

(58) Field of Classification Search
CPC ........... G06F 16/9535; G06F 16/24578; G06F 40/279; G06F 40/30
See application file for complete search history.

(56) References Cited

U.S. PATENT DOCUMENTS

| 9,330,135 B2 | 5/2016 | Lee et al. | |
|---|---|---|---|
| 2009/0018832 A1* | 1/2009 | Mukaigaito | H04M 1/2535 704/E15.024 |
| 2015/0127675 A1* | 5/2015 | Kim | H04N 21/4882 707/765 |

FOREIGN PATENT DOCUMENTS

| JP | 2003-58571 | 2/2003 |
|---|---|---|
| JP | 2008-299655 | 12/2008 |
| KR | 10-2001-0108845 | 12/2001 |
| KR | 10-2004-0063641 | 7/2004 |

\* cited by examiner

*Primary Examiner* — Truong V Vo

(74) *Attorney, Agent, or Firm* — Nixon & Vanderhye, P.C.

(57) ABSTRACT

An electronic apparatus and a controlling method thereof are provided. The electronic apparatus includes a memory configured to store at least one instruction, and a processor configured to execute the at least one instruction to control the electronic apparatus to: determine a keyword from a query based on the query being input, obtain a word related to the keyword based on information on a user preference, and provide a response to the user query based on the keyword and the word. The processor may be configured to control the electronic apparatus to obtain at least one word from among a plurality of candidate words corresponding to the keyword as a word related to the keyword based on the user preference information. For example, at least part of a method of providing a response to a query by the electronic apparatus may use an AI model that is trained using at least one of machine learning, neural network or deep learning algorithm.

18 Claims, 10 Drawing Sheets

ELECTRONIC APPARATUS AND CONTROLLING METHOD THEREOF

CROSS-REFERENCE TO RELATED APPLICATION

This application is based on and claims priority under 35 U.S.C. § 119 to Korean Patent Application No. 10-2019-0000450, filed on Jan. 2, 2019, in the Korean Intellectual Property Office, the disclosure of which is incorporated by reference herein in its entirety.

BACKGROUND

1. Field

The disclosure relates to an electronic apparatus and a controlling method thereof and for example, to an electronic apparatus that provides information in consideration of a user preference and a controlling method thereof.

2. Description of Related Art

In recent years, the amount of information present online and offline is increasing exponentially. With the development of electronic communication technology, users can obtain desired information anytime and anywhere through electronic apparatuses.

In this regard, in recent years, in order for an electronic apparatus to appropriately provide a user with desired information, a question and answer system that provides a response service to a user query is widely used.

Recently, artificial intelligence (AI) systems that implement human-level intelligence have been used in various fields, and question and answer system are also used in various systems in AI systems. For example, an interactive system may provide a search result regarding a user's question in the form of a conversation using a question and answer system.

The question and answer system is a system that provides a user with the results of documents, web pages, etc. which can be the answer to the user's query. The question and answer system may include the step of searching candidates for searching documents, web pages, etc. regarding the user's query and the step of obtaining an answer for generating an answer among the retrieved documents.

Meanwhile, the conventional question and answer system provides a response by analyzing only a user's query and thus, in the case where the user's query is the same, even if the user is different, the same search results are provided for the same question.

SUMMARY

Embodiments of the disclosure provide an electronic apparatus that provides a user with a response to the user's query in consideration of the characteristics of the user, for example, the user's preference, and a controlling method thereof.

An electronic apparatus according to an example embodiment includes a memory configured to store at least one instruction and a processor configured, by executing the at least one instruction, to control the electronic apparatus to: determine a keyword from a query based on the query being input, obtain a word related to the keyword based on information of user preference, and provide an response to the query based on the keyword and the word.

The processor may control the electronic apparatus to obtain at least one word from among a plurality of candidate words corresponding to the keyword as a word related to the keyword based on the user preference information.

The processor may control the electronic apparatus to determine a word corresponding to the keyword from among a plurality of words formed hierarchically based on the user preference information, and obtain a word related to the keyword from among the plurality of keywords that belong to a lower layer of the determined word.

The processor may control the electronic apparatus to provide the keyword and a search result based on a word related to the keyword as a response.

The processor may control the electronic apparatus to provide a query regarding the query as the response based on the keyword and a word related to the keyword.

Each of the plurality of words may have a score corresponding to the user preference information.

The processor may control the electronic apparatus to determine the plurality of candidate words that belong to a lower layer of a word corresponding to the keyword from among the plurality of words, and obtain a word related to the keyword from among the plurality of candidate words based on a score of the plurality of candidate words.

The processor may control the electronic apparatus to obtain a word having a score higher than a predetermined threshold value and having a ratio higher than a predetermined value with respect to a score of a word corresponding to a word of parent as a word related to the keyword, from among the plurality of candidate words.

The processor may control the electronic apparatus to update the score based on a selection regarding the response.

The processor may control the electronic apparatus to, based on the selection corresponding to the word related to the keyword, increase a score of a word related the keyword from among the plurality of words and a score of at least one word that belongs to an upper layer of the word related to the keyword.

The processor may control the electronic apparatus to, based on the selection not corresponding to a word related to the keyword, increase a score of a word corresponding to the selection and a score of at least one word that belongs to an upper layer of a word corresponding to the selection, and decrease a score of a word related to the keyword.

A method of controlling an electronic apparatus according to an example embodiment includes based on a query being input, determining a keyword from the query, obtaining a word related to the keyword based on information on user preference, and providing a response to the query based on the keyword and the word, wherein the obtaining includes obtaining at least one word from among a plurality of candidate words corresponding to the keyword as a word related to the keyword based on the user preference information.

The obtaining may include determining a word corresponding to the keyword from among a plurality of words formed hierarchically based on the user preference information, and obtaining a word related to the keyword from among the plurality of keywords that belong to a lower layer of the determined word.

The providing a response may include providing the keyword and a search result based on a word related to the keyword as the response.

The providing a response may include providing a query regarding the query as the response based on the keyword and a word related to the keyword.

Each of the plurality of words may have a score corresponding to the user preference information.

The obtaining a word related to the keyword may include determining the plurality of candidate words that belong to a lower layer of a word corresponding to the keyword from among the plurality of words, and obtaining a word related to the keyword from among the plurality of candidate words based on a score of the plurality of candidate words.

The obtaining a word related to the keyword may include obtaining a word having a score higher than a predetermined threshold value and having a ratio higher than a predetermined value with respect to a score of a word corresponding to a word of parent as a word related to the keyword, from among the plurality of candidate words.

The controlling method may further include updating the score based on a selection regarding the response.

The updating may include, based on the selection corresponding to a word related to the keyword, increasing a score of the word related the keyword from among the plurality of words and a score of at least one word that belongs to an upper layer of the word related to the keyword.

The updating may include, based on the selection not corresponding to a word related to the keyword, increasing a score of a word corresponding to the selection and a score of at least one word that belongs to an upper layer of a word corresponding to the user's selection, and decreasing a score of a word related to the keyword.

According to an example embodiment, by providing a response to a query in consideration of the user's characteristics, a user-tailored search result reflecting the user' preference and the user's intention may be provided.

Accordingly, the number of search steps and the number or re-searches of the user may be reduced, thereby improving the satisfaction and convenience of the user who uses the electronic apparatus.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
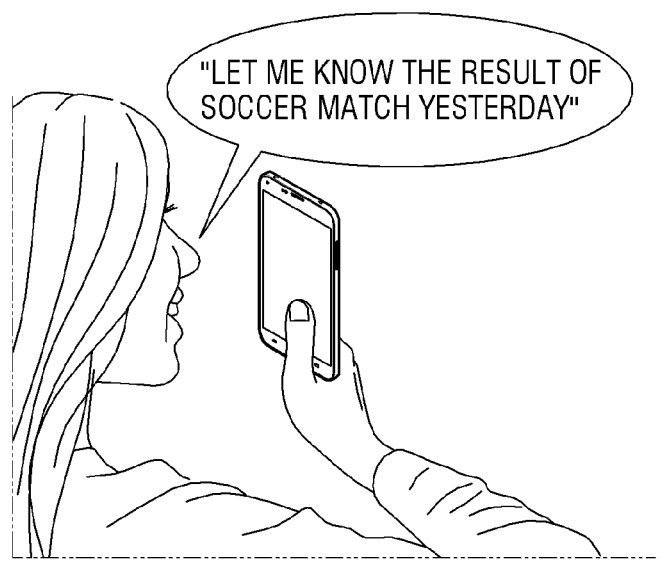
FIG. 1 is a diagram illustrating an example electronic apparatus according to various embodiments.

Hereinafter, various example embodiments of the present disclosure will be described with reference to the accompanying drawings. However, it should be understood that the present disclosure is not limited to the specific embodiments described hereinafter, but includes various modifications, equivalents, and/or alternatives of the embodiments of the present disclosure. In relation to explanation of the drawings, similar drawing reference numerals may be used for similar constituent elements.

In the disclosure, an expression "have", "may have", "include", "may include", or the like, indicates an existence of a corresponding feature (for example, a numerical value, a function, an operation, a component such as a part, or the like), and does not exclude an existence of an additional feature.

In the description, the term "at least one of A or/and B" may include all possible combinations of the items that are enumerated together. For example, the term "at least one of A or/and B" may include: (1) including at least one A, (2) including at least one B, or (3) including both at least one A and at least one B.

Expressions "first", "second", or the like, used in the disclosure may indicate various components regardless of a sequence and/or importance of the components, may be used to distinguish one component from the other components, and do not limit the corresponding components.

When it is mentioned that any component (for example, a first component) is (operatively or communicatively) coupled with/to or is connected to another component (for example, a second component), it is to be understood that any component may be directly coupled with/to another component or may be coupled with/to another component through the other component (for example, a third component). On the other hand, when it is mentioned that any component (for example, a first component) is "directly coupled with/to" or "directly connected to" to another component (for example, a second component), it is to be understood that the other component (for example, a third component) is not present between the directly coupled components.

An expression "configured (or set) to" used in the disclosure may be used interchangeably with an expression "suitable for", "having the capacity to", "designed to", "adapted to", "made to", or "capable of" depending on a situation. A term "configured (or set) to" may not necessarily refer only to "specifically designed to" in hardware. Instead, an expression "an apparatus configured to" may refer to a situation in which the apparatus is "capable of" together with other apparatuses or components. For example, a "processor configured (or set) to perform A, B, and C" may refer, for example, and without limitation, to a dedicated processor (for example, an embedded processor) for performing the corresponding operations or a generic-purpose processor (for example, a central processing unit (CPU) or an application processor), or the like, that may perform the corresponding operations by executing one or more software programs stored in a memory device.

An electronic apparatus according to various example embodiments of the disclosure may include, for example, and without limitation, at least one of, for example, TV, a smartphone, a tablet PC, a mobile phone, a video phone, an e-book reader, a desktop PC, a laptop PC, a netbook computer, a workstation, a server, a PDA, a portable multimedia player (PMP), a camera, a wearable device, or the like. A wearable device may include, for example, and without limitation, at least one of an accessory-type device (e.g.: a watch, a ring, a bracelet, an ankle bracelet, a necklace, glasses, a contact lens, or a head-mounted-device (HMD)), a device integrated with fabrics or clothing (e.g., electronic clothing), a body-attached device (e.g., a skin pad or a tattoo), an implantable circuit, or the like.

In the disclosure, the term "user" may refer to a person who uses an electronic apparatus or a device using an electronic apparatus (e.g.: an artificial intelligence electronic device).

Hereinafter, the present disclosure will be described in greater detail with reference to the accompanying drawings.

FIG. 1 is a diagram illustrating an example electronic apparatus according to various embodiments.

As illustrated in FIG. 1, an electronic apparatus 100 may receive a query, e.g., from a user. The query may refer, for example, to a request for obtaining information required by the user, and may be in various forms.

In FIG. 1, the user queries the electronic apparatus 100 with a declarative sentence, "Let me know the result of the soccer match yesterday", but the query may be in the form of an interrogative sentence, "what was the result of yesterday's soccer game?" The user may query in the form of a sentence including a plurality of natural languages, but may query in the form of at least one word such as 'soccer game' or 'yesterday's soccer game.'

As illustrated in FIG. 1, the user may query through a user voice, but this is only an example. In other words, the user may query through, for example, and without limitation, a text using a user interface (UI).

If the electronic apparatus 100 receives a user's query, the electronic apparatus 100 provides the user with a response to the user's query. To do so, the electronic apparatus 100 may include a Question and Answer (QA) System.

Upon receiving a user's query, the electronic apparatus 100 including the QA system may analyze the user query by obtaining a keyword included in the user query through, for example, natural language processing and determine the user's intent included in the user query. The keyword may, for example, be a word included in the user query and may represent a word having an independent meaning.

The electronic apparatus 100 may obtain information for a response to the user query based on the natural language processing result, for example, from a web server, a hierarchy knowledge base database, etc., and may provide the user with the response information on the user query based on the obtained information through the electronic apparatus 100.

If the user query is received in the form of speech, the electronic apparatus 100 may additionally perform preprocessing on the user's voice signal before performing the natural language processing, and perform voice recognition on the user's voice signal to convert the user voice to a text (e.g., Speech to Text (STT)).

The electronic apparatus 100 may display the response information regarding the user query through a display (not illustrated), but is not limited thereto. The electronic apparatus 100 may convert the response information to speech and output the same through a speaker (not illustrated).

In other words, the electronic apparatus 100 may obtain natural language in the form of voice information including natural language and provide the response information to the user.

In order to perform the above operations, the electronic apparatus 100 may include, for example, and without limitation, an Automatic Speech Recognition (ASR) module (e.g., including various processing circuitry and/or executable program elements), a Natural Language Understanding (NLU) module (e.g., including various processing circuitry and/or executable program elements), a Dialogue Management (DM) module (e.g., including various processing circuitry and/or executable program elements), a Natural Language Generation (NLG) module (e.g., including various processing circuitry and/or executable program elements), etc. The electronic apparatus 100 may include another system (e.g., an interactive system) in addition to the question and answer system, and may user a conversation management module, a natural language generation module and the like included in the interactive system.

In FIG. 1, a smartphone is illustrated as the electronic apparatus 200, but is not necessarily limited thereto. In other words, any electronic apparatus including a question and answer system may be an electronic apparatus of the present disclosure.

The electronic apparatus 100 may provide response information regarding a user query in consideration of the user's query history and preference information.

For example, the electronic apparatus 100 may determine the user's preference information in consideration of the keyword of the query previously searched by the user and the keyword included in the search result selected by the user among the search results provided as a response to the query, and provide response information regarding the user query based on the user's preference information.

For example, if the user has a history of previously asking a question regarding 'soccer' and selecting a search result related to 'soccer team A' from among search results provided as a response, the electronic apparatus 100 may determine that the user is highly interested in 'soccer team A', and even if the user inquires about 'tell me the soccer game result of yesterday', the information about soccer team A will be provided preferentially out of the soccer game results of yesterday.

The electronic apparatus 100 may use a set of a plurality of words hierarchically formed. The electronic apparatus 100 may obtain a word related to a keyword from among at least one word that belongs to a lower layer of a word corresponding to the keyword included in the user query based on the user's preference information, and provide the query regarding the user response based on the keyword included in the user query and the word related to the keyword.

For example, if the user makes a query including the keyword 'soccer', the electronic apparatus 100 may additionally consider the keyword 'soccer team A' considering the user's preference information in addition to the keyword 'soccer', and provide a response to the user query.

As such, the electronic apparatus 100 may provide response information reflecting the characteristics of the user in consideration of the user's search and selection history with respect to the user query, and the user may easily obtain desired information.

Various embodiments regarding specific examples where the electronic apparatus 100 provides response information reflecting the user's characteristics will be provided in greater detail below.

Figure 2:
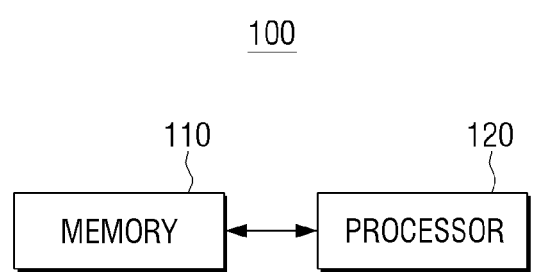
FIG. 2 is a block diagram illustrating an example configuration of an example electronic apparatus according to an embodiment.

FIG. 2 is a block diagram illustrating an example configuration of an example electronic apparatus according to an embodiment.

As illustrated in FIG. 2, the electronic apparatus 100 may include a memory 110 and a processor (e.g., including processing circuitry) 120, but is not limited thereto. Some elements may be added or omitted depending on the type of electronic apparatus.

The memory 110 may store at least one instruction or data regarding at least one of the other elements of the electronic apparatus 100. For example, and without limitation, the memory 110 may be implemented as a non-volatile memory, a volatile memory, a flash memory, a hard disk drive (HDD) or a solid state drive (SDD). The memory 110 may be accessed by the processor 120, and perform readout, recording, correction, deletion, update, and the like, on data by the processor 120.

According to an embodiment of the present disclosure, the memory may include the memory 110, read-only memory (ROM) (not illustrated) and random access memory (RAM) (not illustrated) within the processor 120, and a memory card (not illustrated) mounted on the electronic apparatus 100 (e.g., micro secure digital (SD) card or memory stick). Further, the memory 110 may store programs, data, and so on to constitute various screens to be displayed on the display area of a display.

As described above, the memory 110 may store at least one instruction. The instruction may be provided to configure the processor 120 to control the electronic apparatus 100. For example, the memory 110 may store instructions related to a search application using a question and answer system.

Figure 3:
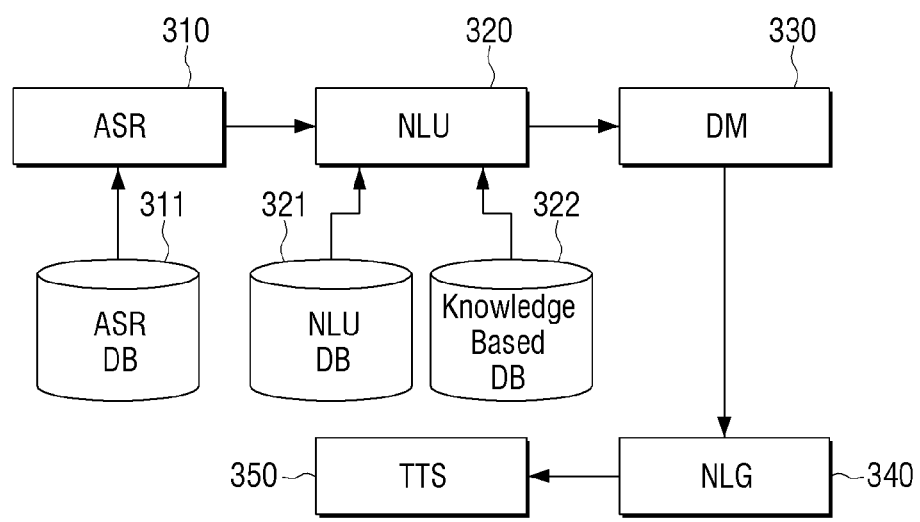
FIG. 3 is a block diagram illustrating an example configuration of an example electronic apparatus according to an embodiment.

The memory 110 may include a plurality of elements (or modules) including a question and answer system as illustrated in FIG. 3. For example, the memory 110 may include a knowledge based database reflecting the preference information of the user who uses the electronic apparatus 100, which will be explained in greater detail below with reference to FIG. 3.

In addition, the memory 110 may store an AI agent to provide a response to a user's query. For example, the electronic apparatus 100 may user an AI agent for generating a natural language as a response to a user's utterance. In this case, the AI agent is a dedicated program for providing AI based services (e.g., a voice recognition service, a secretary service, a translation service, a search service, etc.). In particular, the AI agent may be executed by the existing general purpose processor (e.g., a CPU) or a separate processor dedicated to AI (e.g, a CPU, etc.).

The processor 120 may include various processing circuitry and may be electrically connected to the memory 110 and may control the overall operations and functions of the electronic apparatus 100. For example, by executing at least one command stored in the memory 110, when a user's query is input, the processor 120 may determine from a keyword from the user's query and obtain a word related with the keyword according to the user's preference information. The processor 120 may obtain at least one word from among a plurality of candidate words corresponding to the keyword as a word related with the keyword based on the user's preference information.

For example, the processor 120 may determine a word corresponding to the keyword from among a plurality of words which are hierarchically formed. The word corresponding to the keyword may be the same as the keyword included in the user's query or may have a similar meaning. The processor 120 may obtain a word related with the keyword from among a plurality of candidate words that belong to a lower layer of the determined word.

In this regard, each of the plurality of hierarchical words may have a score corresponding to the user's preference information in order to represent the user's preference information. For example, a word which is frequently included in the user query or a word which is frequently included in the response result selected by the user from among the response results provided to the user may have a high score. On the other hand, a word which is occasionally included in the user query or a word which is occasionally included in the response result selected by the user from among the response results provided to the user may have a low score. The group of a plurality of hierarchical words including such a score may be included in the knowledge based database stored in the memory 110, which will be described in greater detail below with reference to FIG. 3.

The processor 120 may determine a plurality of candidate words that belong to a lower layer of a word corresponding to the keyword from among a plurality of words, and obtain a word related with the keyword from a plurality of candidate words based on the scores of the plurality of plurality of words.

For example, if a user inquires, 'let me know yesterdays' soccer game result', the electronic apparatus 100 may obtain a keyword of 'soccer' from the user's query, determine a plurality of candidate words (e.g., national soccer, Seoul, Daejeon, Busan, overseas soccer, premier league, etc.) that belong to a lower layer of the word corresponding to keyword of 'soccer' from among a plurality of words stored in the knowledge based base, and obtain a word related with the keyword from among the plurality of candidate words based on the scores of the plurality of candidate words.

The processor 120 may provide a response regarding the user's query using the keyword included in the user query and the word related with the keyword.

The processor 120 may perform a search regarding the user query using the key word and the word related with the keyword. In other words, the processor 120 may perform a search regarding the user query considering not only the keyword included in the user query but also the user's preference information using the word related to the selected keyword.

For instance, if the word which is determined based on the user's preference information from among a plurality of candidate words that belong to a lower layer of a word corresponding to 'soccer' mentioned above is 'premier league', the processor 120 may perform a search regarding 'premiere league' from among the search results related to 'soccer' and provide a response.

The processor 120 may provide a response regarding the user query using a question and answer system including a natural language understanding (NLU) module (e.g., including various processing circuitry and/or executable program elements), a dialogue module (DM) module (e.g., including various processing circuitry and/or executable program elements), a natural language generator (NLG) module (e.g., including various processing circuitry and/or executable program elements), etc. stored in the memory 110.

FIG. 3 is a block diagram illustrating an example question and answer system according to an embodiment. As illustrated in FIG. 3, the question and answer system may include an automatic speech recognition (ASR) module (e.g., including various processing circuitry and/or executable program elements) 310, a natural language understanding (NLU) module (e.g., including various processing circuitry and/or executable program elements) 320, a dialogue manager (DM) module (e.g., including various processing circuitry and/or executable program elements) 330, a natural language generator (NLG) module (e.g., including various processing circuitry and/or executable program elements) 340, and a text to speech (TTS) module (e.g., including various processing circuitry and/or executable program elements) 350, but is not limited thereto. The question and answer system may further include other modules, if necessary.

The ASR module 310 may include various processing circuitry and/or executable program elements and convert the user input (particularly, a user query) received from the electronic apparatus 100 into text data. For example, the ASR module 310 may include an utterance recognition module. The utterance recognition module may include an acoustic model and a language model. Each of the modules may include various processing circuitry and/or executable program elements. For instance, the acoustic model may include information related to speech, and the language model may include unit phoneme information and combination of unit phoneme information. The utterance recognition module may convert user utterance into text data using information related to speech and unit phoneme information. The information regarding the acoustic model and the language model, for example, may be stored in automatic speech recognition database (ASR DB) (311).

The natural language understanding (NLU) module 320 may include various processing circuitry and/or executable program elements and determine a user intent by performing syntactic analysis or semantic analysis. According to the syntactic analysis, a user input may be divided in grammatical units (e.g., a word, a phrase, a morpheme, etc.), and it may be determined which grammatical element a divided unit has. The semantic analysis may be performed using semantic matching, rule matching, formula matching, etc. Accordingly, the NLU module 320 may obtain a parameter (or a slot) which is necessary for expressing a domain or an intent regarding a user input.

The NLU module 320 may determine the intent and the parameter of the user using a matching rule divided into the domain, the intent, and the parameter (slot) required to determine the intent. For example, one domain (e.g., web application) may include a plurality of intents (e.g., open the web application, search the web page, etc.), and one intent may include a plurality of parameters (e.g., web page address, search word, etc.). A plurality of rules may include, for example, one or more requisite element parameters. The matching rule may be stored in the natural language understanding database (NLU DB) 321.

The NLU module 320 may identify the meaning of word extracted from the user query using linguistic features (e.g., syntactic elements) such as morphemes and phrases, and determine the intent of the user by matching the identified meaning of the word with the domain and the intent. For example, the NLU module 320 may determine the intent of the user by calculating how much the word extracted from the user input is included in each domain and intent. According to an embodiment, the NLU module 320 may determine a parameter of the user input using a word on which the NLU module 320 bases to identify the intent.

The dialogue manager module 330 may include various processing circuitry and/or executable program elements and determine whether the intent of the user identified by the NLU module 320 is clear. The dialogue manager module 330 may generate a message for confirming the intent of the user which is broadly interpreted by the natural language understanding module 320. The dialogue manager module 330 may check the intent of the user query using the knowledge based database 322 of the natural language understanding module 320.

For example, the dialogue manager module 330 may generate a message, "Do you want to know the EPL game result?", in order to check the intent of the user query which has been interpreted as "let me know the yesterdays' EPL game" identified by the natural language understanding module 320.

The NLG module 340 may include various processing circuitry and/or executable program elements and change the message generated by the dialogue manager module 330 into a text form. The information changed in the text form may be displayed on a display (not illustrated) of the electronic apparatus 100 or may be changed into a speech form by the text-to-speech module 350.

The text-to-speech module 350 may include various processing circuitry and/or executable program elements and change information in the text form into information in the speech form. The text-to-speech module 130 may receive the information in the form of text form from the natural language generator module 340, change the information in the text form into the information in the speech form and output the same to the speaker (not illustrated) of the electronic apparatus 100.

The NLU module 320 and the dialog manager module 330 may be implemented as one module. For example, the NLU module 320 and the dialog manager module 330 may be implemented as a single module to determine the user's intent and parameter, and obtain a response corresponding to the determined user's intent and parameter. As another example, the NLU module 320 and the dialog manager module 330 may obtain a word related with the keyword included in the user query using the knowledge base database 322 in which a plurality of words hierarchically formed are stored according to the user preference information.

The processor 120 may obtain a word included in the user query and a word related with the keyword using the above-described ASR module, NLU module, DM module, NLG module, and TTS module.

In other words, the processor 120 may broadly determine a user's intent included in the user's query based on a word related with a keyword using the above-described plurality of modules. For example, the processor 120 may obtain a word related with a keyword included in the user query using the knowledge based database 322, and determine the user's intent specifically using the word related with the obtained keyword.

The knowledge based database 322 may include information regarding a word that has been used by the user. The knowledge based database 322 may include a keyword included in the user query and information regarding a keyword included in the search result selected by the user from among search results provided by the electronic apparatus 100.

For example, the knowledge based database 322 may include a score corresponding to each keyword. The score corresponding to each keyword indicates the user's preference information regarding the corresponding keyword. In other words, the higher the score corresponding to a keyword, the high the user's preference information regarding the corresponding keyword.

The knowledge based database 322 may include scores according to the keyword included in the user query, the keyword included in the search result selected by the user and the user's preference information and thus, the question and answer system 300 may include different knowledge based database 322 according to each user, that is, a plurality of knowledge based database for each individual.

At least one keyword included in the knowledge based database 322 may be formed hierarchically. The hierarchical structure of at least one keyword included in the knowledge based database 322 may be formed automatically using a deep learning method such as word embedding. The word embedding is a well-known technology and thus, specific description will not be repeated here. Meanwhile, the word embedding is an example, and the hierarchical structure of the keywords included in the knowledge based database 322 may be generated in various methods. For instance, the hierarchical structure may be generated manually by a user.

Figure 4:
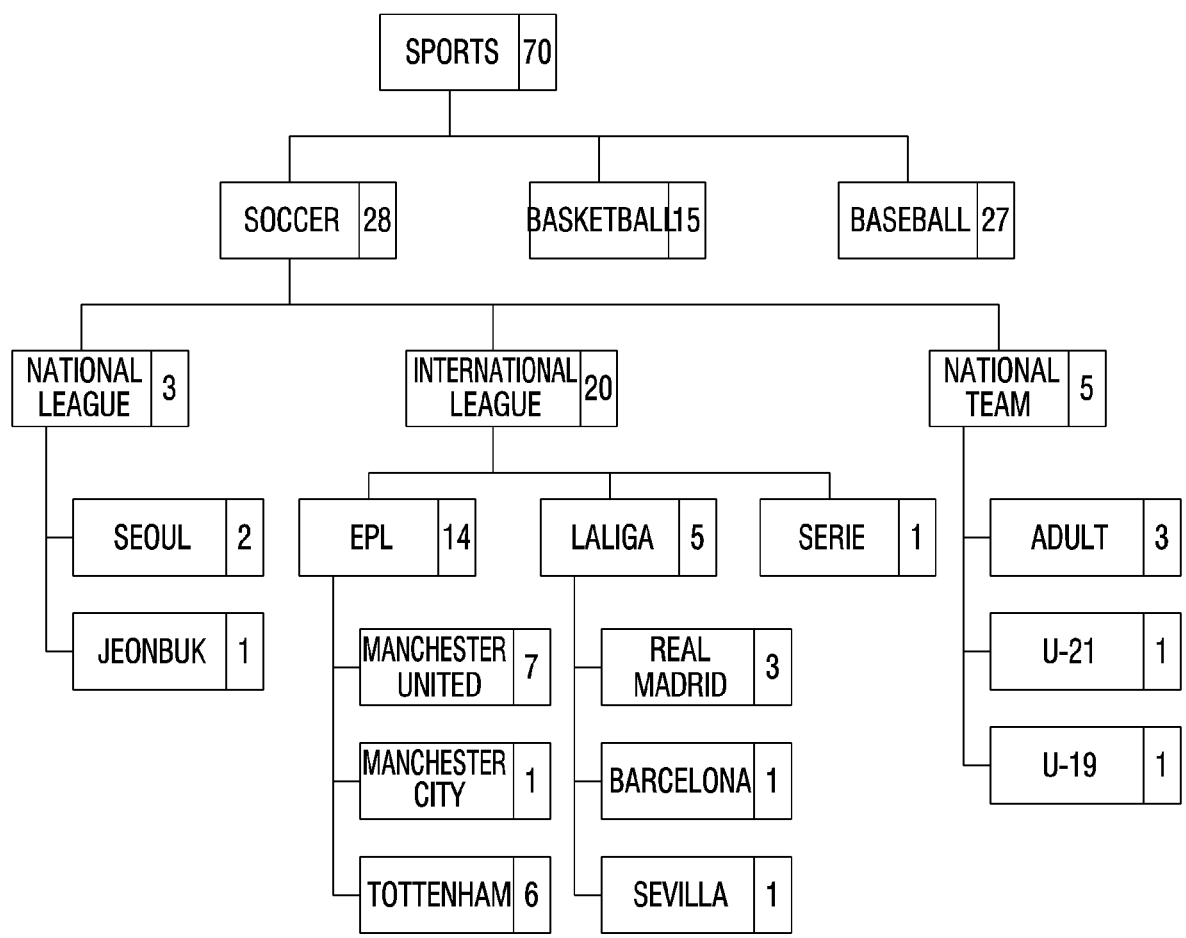
FIGS. 4 and 5 are block diagrams illustrating an example question and answer system according to an embodiment.

In this regard, FIG. 4 is a diagram illustrating an example of the knowledge based database 322 according to an embodiment.

The hierarchical structure of a plurality of words as illustrated in FIG. 4 may be formed based on the user's query history and the history of user's selection (hereinafter, referred to as 'a selection history') of search results provided for each query.

In FIG. 4, the hierarchical structure is illustrated using 'sports' as an example, but the hierarchical structure of a plurality of words stored in the knowledge based database 322 is not limited thereto. In other words, the type of a plurality of words may be various, such as restaurants (meat restaurants, Japanese restaurants, western restaurants, etc.), games (console games, PC games, etc.), hospitals (private hospitals, general hospitals), weather (domestic weather, international weather, etc.), and the like. In addition, the categories of a plurality of words may vary depending on the setting of the user or the setting of the question and answer system.

In FIG. 4, 'sports' is illustrated as the upper most concept, but it not necessarily limited thereto, and there may be higher concept than 'sports.' Likewise, according to the user's query history and selection history, a new keyword (e.g., volleyball) may be added. In this case, such a keyword, as described above, may be added through a deep learning such as word embedding or by a user.

A score corresponding to one keyword (node) may be less than the score of the upper layer (parent node) of the keyword, and may be greater than or equal to the sum of the scores of the lower layer (child node and grandchild node).

For example, the score (28) of the keyword 'soccer' may be smaller than the score (70) of the keyword 'sports', and may be greater than or equal to the sum (28) of the score (3) of the keyword 'national league', the score (20) of 'international league', and the score (5) of 'national team.' Likewise, the score (20) of the keyword 'international league' may be greater than or equal to the sum (20) of the score (14) of the keyword 'EPL', the score (5) of the keyword 'Laliga' and the score (1) of the keyword 'Serie.'

As described above, the processor 120 may broadly determine the intent of a user based on a word related to a keyword included in the user query. The word related with the keyword included in the user query may be a word determined to have high user preference information according to a predetermined determination method from among words related with the keyword included in the user query. In other words, the word related with the keyword included in the user query may represent a word that satisfies a predetermined condition from among a plurality of candidate words that belong to a lower layer of the keyword.

The processor 120 may obtain a word having a score equal to or greater than a predetermined threshold value and a ratio equal to or greater than a predetermined value with respect to the score of the word corresponding to the parent as a word related with the keyword from among a plurality of candidate words that belong to a lower layer of the word corresponding to the keyword.

For example, if a user queries, 'let me know the result of yesterday's soccer game', the processor 120 may obtain keywords such as 'yesterday', 'soccer', 'game', 'let me know', etc. from the user's query, and may broadly interpret the search intent of the user using the keyword 'soccer.' For example, the processor 120 may obtain words having a score value of 10 or more and a score value of 70% or more of the parent word from among a plurality of words that belong to a lower layer of 'soccer' using the knowledge based database 322, and determine that a word with the smallest score value from among the obtained words as a word related with the keyword included in the user query.

Referring to FIG. 4, the words having the score value of 10 or more and the score value of 70% or more of the parent word from among the words that belong to the lower layer of the keyword 'soccer' are the keyword 'international league' and 'EPL', and 'EPL' has the smallest score. Thus, the word related with the keyword included in the query may be 'EPL.'

In addition, the processor 120 may determine that the intent of the user query "let me know the result of yesterday's soccer game" includes not only "let me know the result of yesterday's soccer game" but also "let me know the result of yesterday's EPL game" using the keyword 'EPL' which is extended from the keyword 'soccer' included in the user query.

The processor 120 may provide a response to the user query based on the keyword included in the user query or a word related thereto. To do so, the electronic apparatus 100 may further include other elements in addition to the memory 110 and the processor 120.

Figure 5:
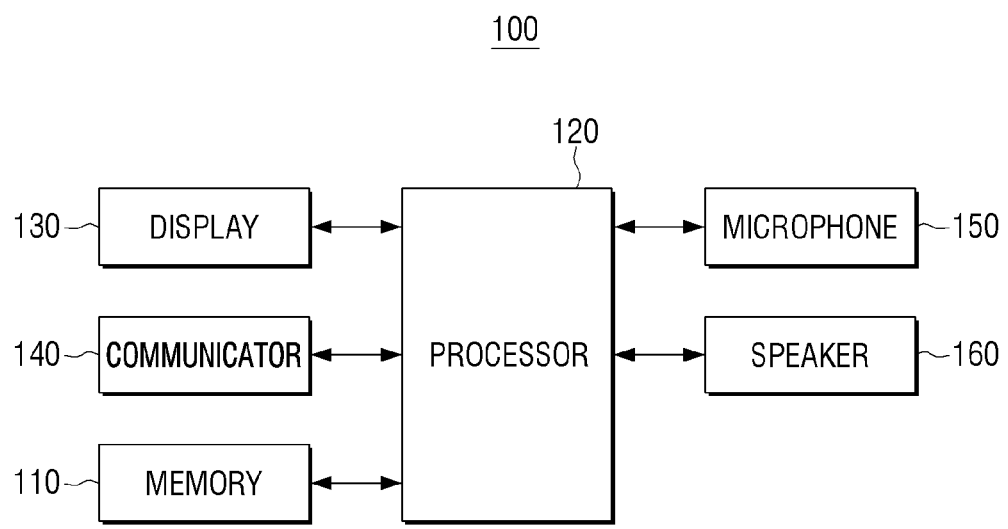

FIG. 5 is a block diagram illustrating an example configuration of an example electronic apparatus according to an embodiment.

As illustrated in FIG. 5, the electronic apparatus 100 may include the memory 110, the processor (e.g., including processing circuitry) 120, a display 130, a communicator (e.g., including communication circuitry) 140, a microphone 150, and a speaker 160. The memory 110 and the processor 120 have been described above with respect to FIG. 2 and thus, overlapping descriptions will not be repeated here.

The display 130 may display various information under the control of the processor 120. The display 130 may display a UI of various applications which are executed in the electronic apparatus 100. In particular, if a user query is input in text through a UI, the display 130 may display the user query.

In addition, the display 130 may display a response regarding the user query. In other words, the display 130 may display a search result or a response based on the keyword included in the user query and a word related with the keyword.

The communicator 140 may include various communication circuitry and may be configured to perform communication with an external electronic apparatus (not illustrated). The electronic apparatus 100 may transmit a keyword included in the user query and a word related with the keyword through the communicator 140, and receive a search result based on the keyword and the word related with the keyword from the external electronic apparatus (not illustrated).

To do so, the communicator 140 may include various communication modules including various communication circuitry, such as, for example, and without limitation, a wired communication module (not shown), a near field wireless communication module (not shown), a wireless communication module (not shown), etc.

The wired communication module may be configured to perform communication with an external apparatus (not shown) according to a wired communication method such as wired Ethernet. The near field wireless communication module may be configured to perform communication with an external apparatus (not shown) located in a short range according to a wireless communication method such as Bluetooth (BT), Bluetooth Low Energy (BLE), Zigbee, etc. In addition, the wireless communication module may be a module connected to an external network according to a wireless communication protocol such as WiFi, IEEE, etc. to perform communication with an external apparatus (not shown) and a voice recognition server (not shown). In addition, the wireless communication module may further include a mobile communication module connected to a mobile communication network to perform communication according to various mobile communication standards such as 3rd Generation (3G), 3rd Generation Partnership Project (3GPP), Long Term Evolution (LTE), LTE Advanced (LTE-A), 5G Networks, etc.

The microphone 150 may include an element for the electronic apparatus 100 to receive a user voice. For example, the microphone 150 may receive an external user voice using a microphone and process the same into electrical voice data. In this case, the microphone 140 may transmit the processed voice data to the processor 120.

The speaker 160 may be an element that outputs various notification sound or voice messages as well as various audio data in which various processing tasks such as decoding, amplification, and noise filtering are performed. In particular, the speaker 160 may output a response to a user's query as a voice message in the form of natural language. The element for outputting audio may be implemented as a speaker, but this is only an example, and it may be implemented as an output terminal for outputting audio data.

The configuration of FIG. 5 is only an example, and depending on the implementation of the electronic apparatus, at least some of the elements of the electronic apparatus 100 illustrated in FIG. 5 may be omitted. For example, the electronic apparatus 100 may be connected to an external electronic apparatus (not shown) including a microphone instead of the microphone 150 and receive a user's voice signal that has been received by the external electronic apparatus (not shown).

Figure 6A:
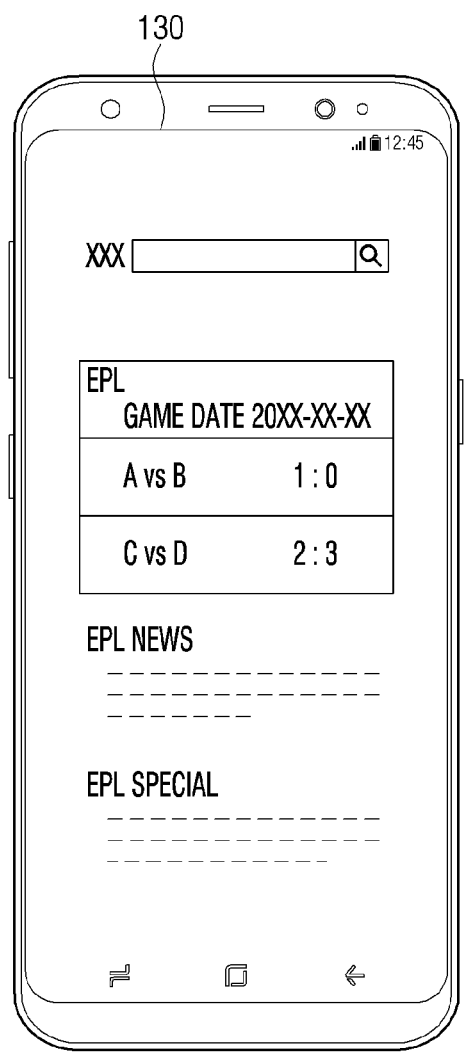
FIGS. 6A, 6B, 7, 8 and 9 are diagrams illustrating an example electronic apparatus according to an embodiment.
Figure 6B:
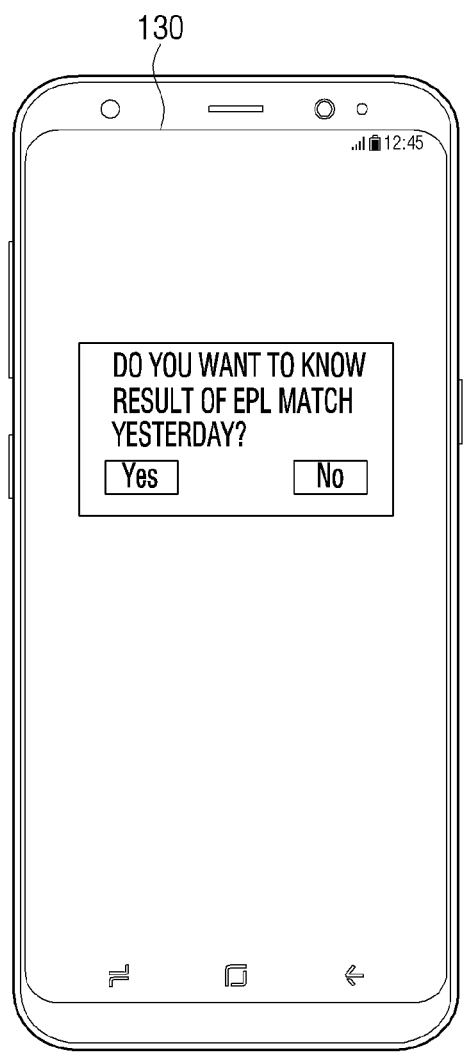

FIGS. 6A and 6B are diagrams illustrating an example electronic apparatus according to an embodiment and illustrate an example electronic apparatus which provides a response to a user's query. The processor 120 may provide a response to the user's query as a keyword and a search result based on a word related with the keyword, or a query regarding the user's query.

Referring to FIG. 6A, the processor 120 may provide a keyword and a search result based on a word related with the keyword as a response to the user query. For example, if the processor 120 obtains a keyword and a word related with the keyword through the natural language understanding module 320, a search result with respect to the keyword and the word related with the keyword may be obtained from a web server through a communicator (not shown). Considering that the word related with the keyword has high user preference information, the processor 120 may preferentially provide a user with a search result based on the word related with the keyword.

For example, as described above with respect to FIG. 4, if a user utters 'let me know the yesterdays' soccer game result' and it is determined that the word related with the keyword 'soccer' is 'EPL', the processor 120 may preferentially provide the yesterdays' EPL game result.

Meanwhile, referring to FIG. 6B, the processor 120 may provide a query regarding a user's query based on the keyword and the word related with the keyword. In other words, the processor 120 may provide a query regarding the word related with the keyword. For example, as described above with respect to FIG. 4, if it is determined that the word related with the keyword 'soccer' included in the user query 'let me know the yesterdays' soccer game result', the processor 120 may provide a query 'do you want to know the result of EPL match yesterday?'.

Meanwhile, FIG. 6B illustrates that a query regarding the user query is displayed on the display 130, but it is only an example. The electronic apparatus 100 may provide a user with a query in various ways. For example, the processor 120 may provide a query regarding the user query in the form of voice using the conversation manager module 330, the natural language generator module 340 and the text-to-speech module 350. For instance, the processor 120 may generate and provide a voice signal of 'do you want to know the result of EPL match yesterday?'.

To do so, as illustrated above with reference to FIG. 5, the electronic apparatus 100 may include the microphone 150 or may transmit a voice signal to another electronic apparatus (not shown) including a microphone connected to the electronic apparatus 100.

The processor 120 may update the score of at least one word included in the knowledge based database 322 based on the user's selection regarding the response provided by the electronic apparatus 100.

Figure 7:
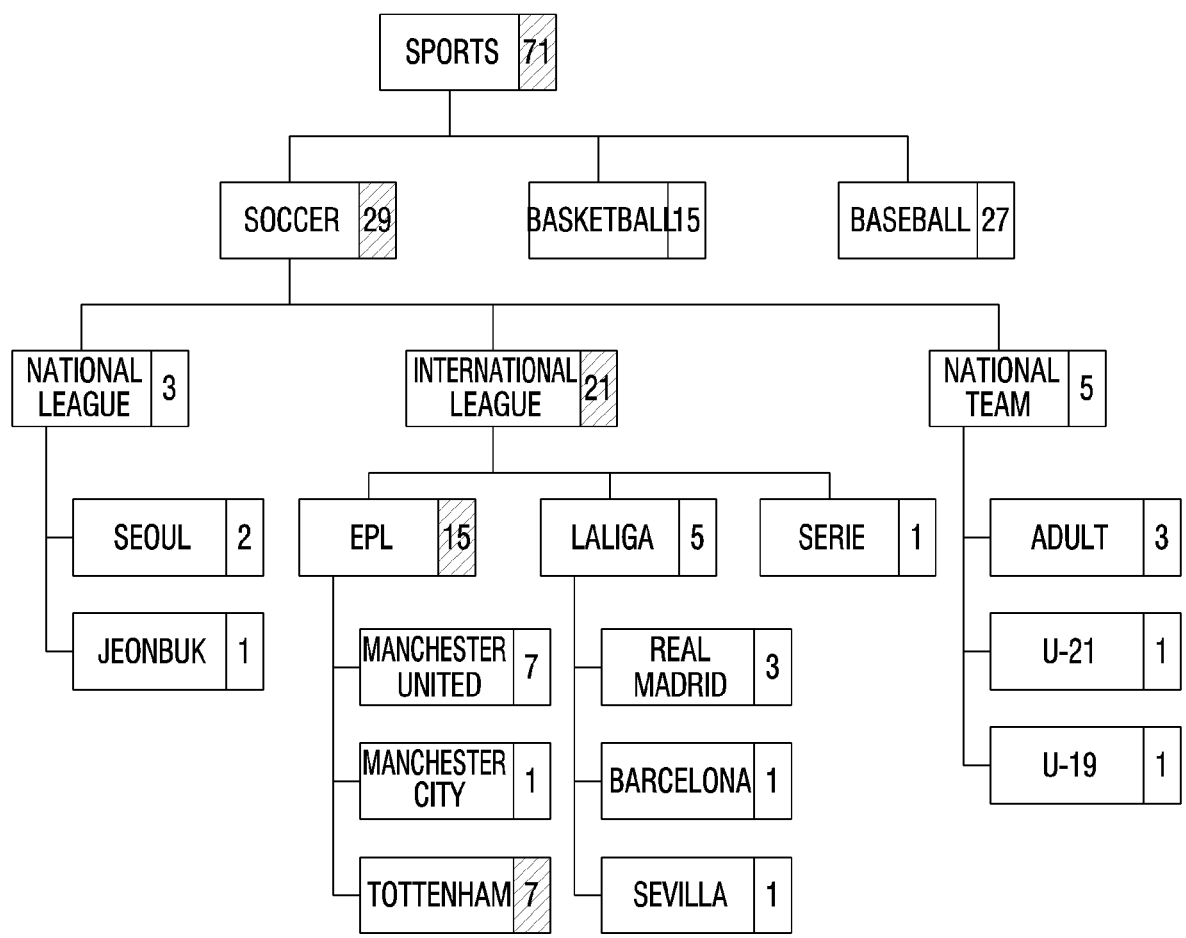
Figure 8:
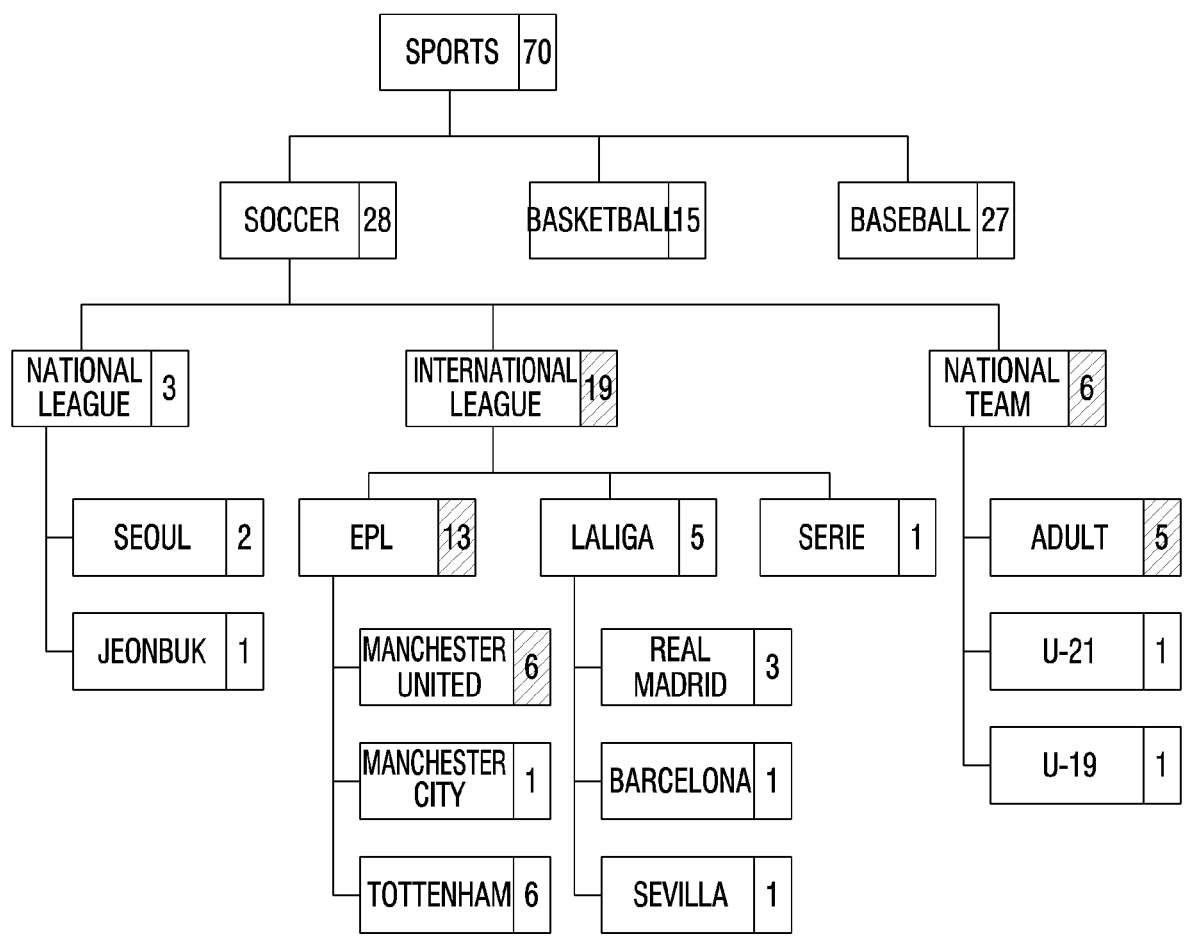

FIGS. 7 and 8 are diagrams illustrating an example electronic apparatus according to an embodiment and illustrate an example of the electronic apparatus 100 which updates the score of at least one word based on the user's selection regarding the response provided by the electronic apparatus 100.

FIG. 7 is a diagram illustrating an example in which one of a keyword and a search result based on a word related with the keyword explained above with respect to FIG. 6A is selected according to an embodiment.

If the user's selection corresponds to the word related with the keyword, the processor 120 may increase the score of the word related with the keyword from among a plurality of words included in the knowledge based database 322 and the score of at least one word that belongs to au upper layer of the word related with the keyword. The user's selection corresponding to the word related with the keyword indicates the word related with the keyword is included in the search result selected by the user from among the search results provided by the processor 120.

For example, if the user selects a search result related to 'EPL' from among responses regarding 'yesterday's soccer game result' and 'yesterdays' EPL game result' provided by the processor 120, for example, if the user selects a search result including the term 'EPL', the processor 120 may increase the score of 'EPL' and the score of at least one word that belong to the upper layer. The at least one word that belongs to the upper layer represents words existing in a path from the word related with the keyword to the words in the uppermost layer, and in case of FIGS. 6A and 6B, the at least one word corresponds to 'overseas league', 'soccer', and 'sports.'

Meanwhile, according to another embodiment, if one of the keyword and a search result based on the word related with the keyword is selected by the user, the processor 120 may obtain a keyword from the selected search result using the natural language generator module 320.

Considering that the selected search result is selected by the user, the selected search result reflects the user's preference information, and the keyword included in the selected search result may be a keyword which reflects the user's preference information.

Accordingly, the processor 120 may update the scores of a plurality of words included in the knowledge based database 322 based on the search result selected by the user. For example, the processor 120 may obtain a keyword from the search result selected by the user, and determine whether the obtained keyword is included in the knowledge based database 322.

If the obtained keyword is included in the knowledge based database 322, the score of the word corresponding to the obtained keyword and the score of at least one word that beings to the upper layer may be increased. The at least one word that belongs to the upper layer indicates a parent node of the obtained keyword and a word corresponding to an ancestor node. In other words, the processor 120 may increase the score of the obtained keyword, and may recursively increase the score of the parent node of the node whose score is increased. As a result, the processor 120 may increase the score of a word present in a path from a word corresponding to the obtained keyword to a word corresponding to a uppermost layer from among a plurality of words included in the knowledge based database 322.

For example, as described with reference to FIG. 6A, it is assumed that the user selects a result while the EPL game result is displayed and the search result selected by the user includes contents regarding 'Tottenham' from among teams that belong to EPL.

The processor 120 may obtain the keyword 'Tottenham' from the search result selected by the user using the natural language understanding module 320. Subsequently, the processor 120 may increase the score of the keyword regarding 'Tottenham' stored in the knowledge based database 322 and the scores of the keywords 'EPL', 'overseas league', 'soccer', and 'sports' that belong to the upper layer thereof.

This can be applied to the case in which the processor 120 provides a query as a response to a user's query.

For instance, as illustrated in FIG. 6B, if the processor 120 queries 'do you want to know result of EPL match yesterday?', and the user selects 'yes', the processor 120 may provide the user with the yesterdays' EPL game result, and if the contents regarding 'Tottenham' is included in the result selected by the user, as described above, the scores may be increased sequentially from 'Tottenham' to 'sports' that belongs to the uppermost layer.

On the other hand, there may be a case in which the user's selection does not correspond to the word related with the keyword.

FIG. 8 is a diagram illustrating an example in which the user's selection does not correspond to the word related with the keyword according to an embodiment.

If the user's selection regarding the response of the electronic apparatus 100 does not correspond to the word related with the keyword, the processor 120 may increase the score of the word corresponding to the user's selection from among a plurality of words that belong to the knowledge based database 322 and the score of at least one word that belongs to the upper layer of the word corresponding to the user's selection, and decrease the score of the word related with the keyword.

The user selection not corresponding to the word related with the keyword indicates that the word related with the keyword is not included in the search result corresponding to the user's selection. This may indicate, for example, that the user's reference information is decreased regarding the word related with the keyword. On the other hand, it may indicate that the preference regarding the word corresponding to the user's selection and the word that belongs to the upper layer is increased.

Accordingly, the processor 120 may update scores by reflecting the user's preference information.

For example, in FIG. 6B, if the user answers 'no' to the query 'do you want to know the result of EPL match yesterday?' and asks 'let me know the adult national team result', the processor 120 may reduce the score of the word related with the keyword and the score of the upper and lower layers of the word related with the keyword. For example, the processor 120 may reduce the scores from the word 'EPL' to the words present in a path to the uppermost layer, 'overseas league', 'soccer', 'sports', and the score of at least one word that belongs to the lower layer of 'EPL' (e.g., 'Manchester United'). In this disclosure, the score of the highest score word (e.g., 'Manchester United') is reduced from among the words that belong to the lower layer of the word related with the keyword, but this may vary depending on circumstances.

In addition, considering that the preference information increases for the word corresponding to the user's selection and the words that belong to the upper layer thereof, the processor 120 may increase the score of the word corresponding to the user's selection and the scores of the words that belong to the upper layer of the word corresponding to the user's selection. This has been already described above with reference to FIGS. 6A and 6B, and specific descriptions may not be repeated here.

For example, the processor 120 may increase the scores of 'adult', 'national team', 'soccer', and 'sports.'

In this disclosure, the scores of 'soccer' and 'sports' which belong to the upper layer of 'EPL' are decreased, but their scores are increased as they belong to the upper layer of 'national team.' In other words, if the decrease amount and increase amount of the score are the same, as illustrated in FIGS. 4 and 8, the scores of 'soccer' and 'sports' may remain unchanged.

Figure 9:
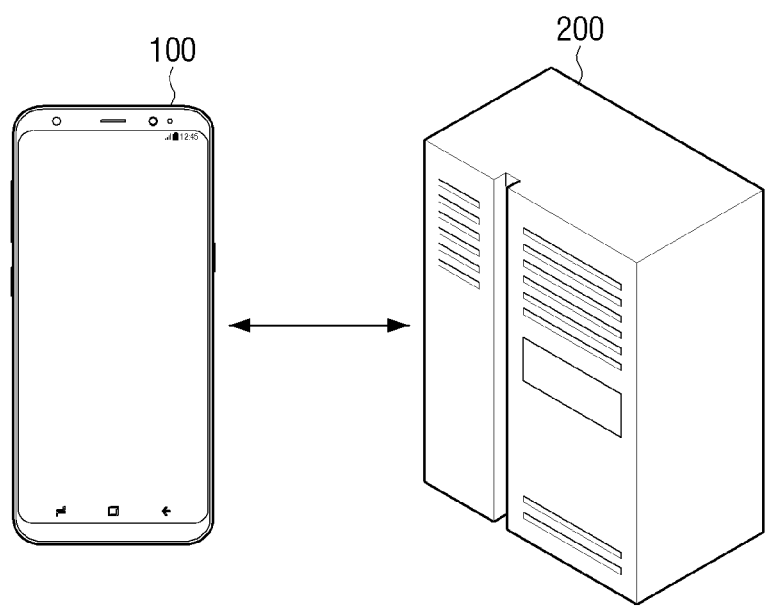

FIG. 9 is a diagram illustrating an example electronic apparatus according to an embodiment.

FIGS. 1, 2, 3, 4, 5, 6A, 6B, 7 and 8 illustrate that the electronic apparatus 100 stores a question and answer system including the ARS module, the NLU module, the DM module, NLG module and TTS module in the memory 110 and provides a response to a user's query, but it is not necessarily limited thereto.

In other words, the electronic apparatus 100 may include only a part of the above-described modules. For example, the electronic apparatus 100 may include only the ARS module and only perform the function of converting a user voice to a text (Speech to Text, STT). In this case, the electronic apparatus 100 may convert the user voice into a text and transmit the converted text to the external electronic apparatus 200 (e.g., a server) which performs natural language processing, etc. In other words, the external electronic apparatus 100 may obtain a keyword from the user's query which has been converted to be in a text form and determine the user's intent of the query. The external electronic apparatus 200 may transmit the natural language processing result to the electronic apparatus 100 or an external electronic apparatus (not shown) such as a web server, etc. so that another electronic apparatus (not shown) can search the response information regarding the user query.

In other words, a part of the operations of the question and answer system can be performed in the external electronic apparatus 200 and to do so, the electronic apparatus 100 may be connected to the external electronic apparatus 200.

Figure 10:
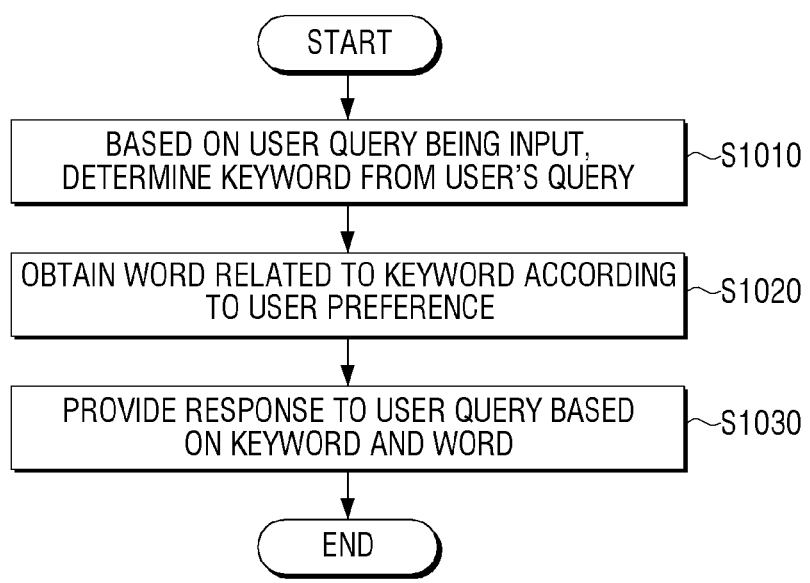
FIG. 10 is a flowchart illustrating an example method of controlling an electronic apparatus for providing a response to a user's query according to an embodiment.

FIG. 10 is a flowchart illustrating an example method of controlling an electronic apparatus for providing a response to a user's query according to an embodiment.

When a user's query is input, a keyword may be determined from the user query (S1010). The query may indicate a request for obtaining information required by the user, and may be in various forms. The keyword is a word included in the user query and may represent a word having an independent meaning.

A word related with the keyword is obtained according to the user's preference information (S1020). In this case, at least one word from among a plurality of candidate words that belong to the keyword may be obtained as a word related with the keyword based on the user's preference information.

Based on the keyword and the word, a response to the user query is provided (S1030).

In this example, step S1020 may include determining a word corresponding to the keyword from among a plurality of words that are formed hierarchically according to the user's preference information, and obtaining a word related with the keyword from among a plurality of candidate words that belong to the lower layer of the determined word.

In addition, S1030 step may include providing a search result based on the keyword and the word related with the keyword as a response.

In addition, S1030 may include providing a query regarding a user's query based on the key word and the word related with the keyword as a response. Here, each of a plurality of words may have a score corresponding to the user preference information.

S1020 may include determining a plurality of candidate words that belong to a lower layer of the word corresponding to the key word from among a plurality of words and obtaining a word related with the keyword from among the plurality of candidate words based on the scores of the plurality of candidate words.

S1020 may include obtaining a word having a score that is equal to or greater than a predetermined threshold value and a ratio that is equal to or greater than a predetermined value with respect to the score of the word corresponding to the parent from among a plurality of candidate words as a word related with the keyword.

The method may further include updating scores based on the user's selection regarding a response.

The updating may include, if the user's selection corresponds to the word related with the keyword, increasing the score of the word related with the keyword and at least one word that belongs to a layer of the word related with the keyword.

In addition, the updating may include, if the user's selection does not correspond to the word related with the keyword, increasing the word corresponding to the user's selection and at least one word that belongs to a layer of the word corresponding to the user's selection and decreasing the score of the word related with the keyword.

The term "a part" or "a module" used in the disclosure includes a unit including hardware, software, or firmware, or a combination thereof, and it may be interchangeably used with terms, for example, logic, a logical block, a component, or a circuit. Also, "a part" or "a module" may be a component including an integrated body or a minimum unit performing one or more functions or a portion thereof. For example, a module may include an application-specific integrated circuit (ASIC).

The various example embodiments of the disclosure may be implemented as software including instructions stored in machine-readable storage media, which can be read by machines (e.g., computers). The machines may refer to devices that call instructions stored in a storage medium, and can operate according to the called instructions, and the devices may include an electronic device according to the aforementioned embodiments (e.g., an electronic apparatus 100). In case an instruction is executed by a processor, the processor may perform a function corresponding to the instruction by itself, or using other components under its control. An instruction may include a code that is generated by a compiler or a code executable by an interpreter. A storage medium that is readable by machines may be provided in the form of a non-transitory storage medium. The 'non-transitory' storage medium may not include signals, and is tangible.

Also, according to an embodiment of the disclosure, methods according to the various embodiments described in the disclosure may be provided while being included in a computer program product. A computer program product refers to a product, and it can be traded (e.g., bought and/or sold) between a seller and a buyer. A computer program product can be distributed on-line in the form of a storage medium that is readable by machines (e.g., a compact disc read only memory (CD-ROM)), or through an application store (e.g., Play Store™). In the case of on-line distribution, at least a portion of a computer program product may be stored in a storage medium such as the server of the manufacturer, the server of the application store, and the memory of the relay server at least temporarily, or may be generated temporarily.

The respective components (e.g., module or program) according to the various example embodiments may include a single entity or a plurality of entities, and some of the corresponding sub-components described above may be omitted, or another sub-component may be further added to the various example embodiments. Alternatively or additionally, some components (e.g., module or program) may be combined to form a single entity which performs the same or similar functions as the corresponding elements before being combined. Operations performed by a module, a program, or other component, according to various example embodiments, may be sequential, parallel, or both, executed iteratively or heuristically, or at least some operations may be performed in a different order, omitted, or other operations may be added.

While the disclosure has been illustrated and described with reference to various example embodiments, it will be understood that the various example embodiments are intended to be illustrative, not limiting. It will also be understood that various changes in form and detail may be made without departing from the spirit and scope of the disclosure, including the appended claims and their equivalents.

What is claimed is:

1. An electronic apparatus comprising:
a memory configured to store at least one instruction; and
a processor configured execute the at least one instruction to control the electronic apparatus to:
identify a keyword from a query based on the query being input,
identify user preference information based on the keyword and at least one keyword included in a search result selected by a user among a plurality of search results provided as a previous response to the query,
identify a word corresponding to the keyword from among the plurality of words,
obtain a word related to the keyword from among words belonging to a lower hierarchical layer in a hierarchical structure than the identified word based on the user preference information, and
provide a response to the query based on the keyword and the word related to the keyword, wherein the memory is configured to store a plurality of words in the hierarchical structure based on the user preference information.

2. The apparatus as claimed in claim 1, wherein the processor is configured to control the electronic apparatus to provide, as the response, the keyword and a search result based on the word related to the keyword.

3. The apparatus as claimed in claim 1, wherein the processor is configured to control the electronic apparatus to provide, as the response, a query regarding the query, based on the keyword and the word related to the keyword.

4. The apparatus as claimed in claim 1, wherein each of the plurality of words has a score based on the user preference information.

5. The apparatus as claimed in claim 4, wherein the processor is configured to control the electronic apparatus to identify the plurality of candidate words belonging to lower hierarchical layers than the identified word, and obtain the word related to the keyword from among the plurality of candidate words based on respective scores of the plurality of candidate words.

6. The apparatus as claimed in claim 5, wherein the processor is configured to control the electronic apparatus to obtain, as the word related to the keyword, a word having a score higher than a threshold value and having a ratio higher than a ratio value with respect to a score of a word corresponding to a parent word.

7. The apparatus as claimed in claim 4, wherein the processor is configured to control the electronic apparatus to update one or more scores based on a selection regarding the response.

8. The apparatus as claimed in claim 7, wherein the processor is configured to control the electronic apparatus to increase a score of the word related the keyword and a score of at least one word that belonging to a hierarchical layer higher than a hierarchical layer of the word related to the keyword based on the selection corresponding to the word related to the keyword.

9. The apparatus as claimed in claim 7, wherein the processor in configured to control the electronic apparatus to:
   increase a score of a word corresponding to the selection and a score of at least one word belonging to a hierarchical layer of the word corresponding to the selection based on the selection not corresponding to the word related to the keyword, and
   decrease a score of the word related to the keyword.

10. A method of controlling an electronic apparatus, the method comprising:
    identifying a keyword from a query based on the query being input;
    identifying user preference information based on the keyword and at least one keyword included in a search result selected by a user among a plurality of search results provided as a previous response to the query;
    identifying a word corresponding to the keyword from among the plurality of words;
    obtaining a word related to the keyword from among words belonging to a lower hierarchical layer in a hierarchical structure than the identified word based on the user preference information; and
    providing a response to the query based on the keyword and the word related to the keyword,
    wherein a plurality of words are stored in the hierarchical structure based on the user preference information.

11. The method as claimed in claim 10, wherein the providing a response comprises providing, as the response, the keyword and a search result based on the word related to the keyword.

12. The method as claimed in claim 10, wherein the providing a response comprises providing, as the response, a query regarding the query, based on the keyword and the word related to the keyword.

13. The method as claimed in claim 10, wherein each of the plurality of words has a score based on the user preference information.

14. The method as claimed in claim 13, wherein the obtaining a word related to the keyword comprises identifying the plurality of candidate words belonging to lower hierarchical layers than the identified word; and
    obtaining the word related to the keyword from among the plurality of candidate words based on respective scores of the plurality of candidate words.

15. The method as claimed in claim 14, wherein the obtaining a word related to the keyword comprises obtaining, as the word related to the keyword, a word having a score higher than a threshold value and having a ratio higher than a ratio value with respect to a score of a word corresponding to a parent word.

16. The method as claimed in claim 13, further comprising:
    updating one or more scores based on a selection regarding the response.

17. The method as claimed in claim 16, wherein the updating comprises, based on the selection corresponding to the word related to the keyword, increasing a score of the word related to the keyword and a score of at least one word belonging to a hierarchical layer higher than a hierarchical layer of the word related to the keyword.

18. The method as claimed in claim 17, wherein the updating comprises, based on the selection not corresponding to the word related to the keyword, increasing a score of a word corresponding to the selection and a score of at least one word belonging to a hierarchical layer of the word related to the keyword; and
    decreasing a score of the word related to the keyword.

* * * * *